US011901530B2

(12) United States Patent
Lee et al.

(10) Patent No.: US 11,901,530 B2
(45) Date of Patent: Feb. 13, 2024

(54) BATTERY MODULE INCLUDING BUS BAR ASSEMBLY SIDELY DISPOSED ON ELECTRODE TABS OF BATTERY CELLS AND MANUFACTURING METHOD THEREOF

(71) Applicant: SK INNOVATION CO., LTD., Seoul (KR)

(72) Inventors: Seung Hun Lee, Daejeon (KR); Tae Gu Lee, Daejeon (KR); Kwan Yong Kim, Daejeon (KR); Kenneth Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 286 days.

(21) Appl. No.: 16/785,115

(22) Filed: Feb. 7, 2020

(65) Prior Publication Data

US 2020/0259152 A1   Aug. 13, 2020

(30) Foreign Application Priority Data

Feb. 8, 2019   (KR) .................. 10-2019-0014974

(51) Int. Cl.
*H01M 10/613*       (2014.01)
*H01M 10/6554*     (2014.01)
(Continued)

(52) U.S. Cl.
CPC ..... *H01M 10/613* (2015.04); *H01M 10/6554* (2015.04); *H01M 50/271* (2021.01);
(Continued)

(58) Field of Classification Search
CPC ............. H01M 50/502; H01M 50/531; H01M 10/613; H01M 10/6554
(Continued)

(56) References Cited

U.S. PATENT DOCUMENTS 10,128,483 B2   11/2018   Lee
2005/0031946 A1   2/2005   Kruger et al.
(Continued)

FOREIGN PATENT DOCUMENTS

CN   105514498 A   *   4/2016   .......... H01M 10/058
CN   108321346 A        7/2018
(Continued)

OTHER PUBLICATIONS

"Groove." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1252429. (Year: 2010).*
(Continued)

*Primary Examiner* — Sean P Cullen
(74) *Attorney, Agent, or Firm* — IP & T GROUP LLP

(57) ABSTRACT

A battery module which includes: a battery stack formed by stacking a plurality of battery cells respectively including electrode tabs on each other; and bus bar assemblies located on sides of the battery stack, from which the electrode tabs are drawn out, to electrically connect the plurality of battery cells to each other through a plurality of electrode tabs, wherein each of the bus bar assemblies includes a plurality of openings configured to hold the plurality of electrode tabs, and each of the plurality of openings includes an insertion portion formed by opening one side thereof so that the electrode tab is slidely inserted in a direction perpendicular to a direction in which the electrode tabs are drawn out.

13 Claims, 9 Drawing Sheets

(51) Int. Cl.
*H01M 50/271* (2021.01)
*H01M 50/507* (2021.01)
*H01M 50/516* (2021.01)
*H01M 50/536* (2021.01)
*H01M 50/209* (2021.01)

(52) U.S. Cl.
CPC ........ *H01M 50/507* (2021.01); *H01M 50/209* (2021.01); *H01M 50/516* (2021.01); *H01M 50/536* (2021.01)

(58) Field of Classification Search
USPC .......................................... 429/120, 158, 160
See application file for complete search history.

(56) References Cited

U.S. PATENT DOCUMENTS

| | | | | |
|---|---|---|---|---|
| 2011/0076546 | A1* | 3/2011 | Choi | H01M 10/0413 |
| | | | | 429/158 |
| 2011/0091763 | A1* | 4/2011 | Park | H01M 50/579 |
| | | | | 429/158 |
| 2018/0183020 | A1† | 6/2018 | Ju | |
| 2018/0315977 | A1* | 11/2018 | Park | H01M 50/505 |
| 2019/0221798 | A1* | 7/2019 | Eisermann | H01M 50/502 |
| 2021/0167472 | A1* | 6/2021 | Birkholz | H01M 50/227 |

FOREIGN PATENT DOCUMENTS

| | | | | |
|---|---|---|---|---|
| EP | 1798787 | A2 | 6/2007 | |
| EP | 3340345 | A1 * | 6/2018 | ........... B23K 26/244 |
| EP | 3367471 | A1 | 8/2018 | |
| JP | 2007-265945 | A | 10/2007 | |
| JP | 4829587 | | 12/2011 | |
| JP | 6115265 | | 4/2017 | |
| JP | 2017-084468 | A | 5/2017 | |
| KR | 10-2013-0042430 | A † | 4/2013 | |
| KR | 10-2014-0005194 | | 1/2014 | |
| KR | 10-2018-0067198 | A † | 6/2018 | |
| KR | 10-2018-0074592 | | 7/2018 | |
| WO | 2018/065580 | A1 | 4/2018 | |
| WO | WO-2018065580 | A1 * | 4/2018 | ............ H01M 50/20 |
| WO | WO-2018220197 | A2 * | 12/2018 | .......... H01M 10/486 |

OTHER PUBLICATIONS

"Hole." In New Oxford American Dictionary, edited by Stevenson, Angus, and Christine A. Lindberg. : Oxford University Press, 2010 . https://www.oxfordreference.com/view/10.1093/acref/9780195392883.001.0001/m_en_us1255324. (Year: 2010).*

"Convex." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1235797. (Year: 2010).*

"Connect." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1235403. (Year: 2010).*

"Link." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1263659. (Year: 2010).*

Extended European Search Report issued by the EPO dated Jul. 7, 2020.

Office Action for Chinese Patent Application No. 202010084650.4 issued by the Chinese Patent Office dated Aug. 18, 2022.

\* cited by examiner
† cited by third party

BATTERY MODULE INCLUDING BUS BAR ASSEMBLY SIDELY DISPOSED ON ELECTRODE TABS OF BATTERY CELLS AND MANUFACTURING METHOD THEREOF

CROSS-REFERENCE TO RELATED APPLICATION

This application claims priority to Korean Patent Applications No. 10-2019-0014974 filed on Feb. 8, 2019, the entire disclosure of which is incorporated by reference herein.

BACKGROUND OF THE INVENTION

1. Field of the Invention

One embodiment of the present invention relates to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

As described above, when the plurality of secondary batteries are connected with each other in series to be used in a high-output hybrid vehicle or an electric vehicle, the plurality of secondary batteries are fixed using a member such as a cover or a case, then a plurality of battery cells are electrically connected with each other using a connection member such as a bus bar. Therefore, the plurality of secondary batteries may be used as one battery module form.

However, in a case of Korean Patent Laid-Open Publication No. 10-2018-0074592 below, when inserting electrode tabs into holes formed in a bus bar, the bus bar is moved toward the battery cells in a direction in which the electrode tabs are drawn out. However, there is a problem that, when a tolerance occurs in an arrangement interval between the electrode tabs drawn from each of the plurality of battery cells, it is not easy to respectively insert the electrode tabs into each of the plurality of holes formed in the bus bar, and costs and time between manufacturing processes are increased.

In addition, in the conventional case, a method of stacking and housing a plurality of secondary batteries in a longitudinal direction in a module housing is mainly used. In this case, a plurality of exterior case members are required to form the module housing, and a welding process is mainly used to connect a plurality of case members to each other.

However, there is a problem that a burden on manufacturing costs and welding quality control between the manufacturing processes such as the above-described welding process has to be increased, and a deviation in a quality level between battery module products should occur depending on an adhesion state such as welding.

PRIOR ART DOCUMENT

Patent Document (Patent Document 1) Korean Patent Laid-Open Publication No. 10-2018-0074592 (published on Jul. 3, 2018)

SUMMARY OF THE INVENTION

It is an object of embodiments of the present invention to provide a battery module and a manufacturing method thereof, in which each of a plurality of electrode tabs may be easily positioned in each of a plurality of openings formed in a bus bar assembly.

In addition, another object of the embodiments of the present invention to provide a battery module and a manufacturing method thereof, which may improve an assembly performance between a plurality of electrode tabs and a bus bar assembly.

Further, another object of the embodiments of the present invention is to provide a battery module and a manufacturing method thereof, wherein, even in a case of electrode tabs not arranged at a uniform interval, the electrode tabs may be easily inserted into openings of a bus bar assembly.

Further, another object of the embodiments of the present invention is to provide a battery module and a manufacturing method thereof, which includes an insertion portion for inserting electrode tabs formed on one longitudinal side of an opening, and may maintain a structural rigidity of a bus bar.

Furthermore, it is an object of embodiments of the present invention to provide a battery module and a manufacturing method thereof, which may maintain a structural rigidity even when vibrations or shocks are applied from an outside.

To achieve the above objects, according to an aspect of the present invention, there is provided a battery module including: a battery stack formed by stacking a plurality of battery cells respectively including electrode tabs on each other; and bus bar assemblies located on sides of the battery stack, from which the electrode tabs are drawn out, to electrically connect the plurality of battery cells to each other through a plurality of electrode tabs, wherein each of the bus bar assemblies includes a plurality of openings configured hold the plurality of electrode tabs, and each of the plurality of openings includes an insertion portion formed by opening one side thereof so that the electrode tab is slidely inserted in a direction perpendicular to a direction in which the electrode tabs are drawn out.

As the bus bar assembly is slidely disposed in the direction perpendicular to the direction in which the electrode tabs are drawn out, each of the plurality of electrode tabs may be inserted and held in each of the plurality of openings.

The bus bar assembly may include: one or more bus bars respectively including one or more bus bar holes; and a bus bar support configured to support the one or more bus bars spaced apart from each other, wherein each of the bus bar supports includes one or more support grooves respectively formed so as to be located parallel to the one or more bus bar holes in the direction in which the electrode tabs are drawn out, and the one or more bus bar holes and the one or more support grooves are formed so as to have a predetermined length in the direction perpendicular to the direction in which the electrode tabs are drawn out, respectively.

The insertion portion may be formed in one longitudinal end of the support groove in each of the one or more support grooves.

Each of the one or more bus bars may include a convex portion formed by protruding one longitudinal side of the bus bar hole in the direction in which the electrode tabs are drawn out.

Both longitudinal ends of each of the one or more bus bar holes in each of the one or more bus bars may be formed to be blocked.

The insertion portion may be formed with a width decreased toward inside the support groove from a lower end thereof on a side in which the electrode tab enters so as to guide an entry of the electrode tab.

The battery module may further include an upper assembly disposed on an upper side of the battery stack parallel to a direction in which the battery cells are stacked, and the bus bar assembly is integrally formed with the upper assembly in a direction perpendicular thereto.

The bus bar assembly may be bound with a cooling plate.

According to another aspect of the present invention, there is provided a method of manufacturing a battery module including: stacking a plurality of battery cells respectively including electrode tabs on each other to form a battery stack; and disposing bus bar assemblies on sides of the battery stack, from which the electrode tabs are drawn out, wherein each of the bus bar assemblies includes a plurality of openings configured to hold each of a plurality of electrode tabs, wherein the bus bar assemblies are slidely disposed in a direction perpendicular to the direction in which the electrode tabs are drawn out.

Each of the plurality of electrode tabs may be inserted into each of a plurality of openings through an insertion portion formed to be opened outward from one end of each of the plurality of openings in the direction perpendicular to the direction in which the electrode tabs are drawn out.

The bus bar assembly may be integrally formed with an upper assembly in a direction perpendicular thereto, which is disposed on an upper side of the battery stack parallel to a direction in which the battery cells are stacked; and during disposing the upper assembly on the upper side of the battery stack, the electrode tabs of the battery stack may be slidely disposed on a side of the battery stack, from which the electrode tabs are drawn out.

A plurality of openings may be formed in the bus bar assembly, each of which is configured to hold each of the plurality of electrode tabs, and each of the plurality of electrode tabs may be slidely inserted into the plurality of openings through an insertion portion formed to be opened outward from one end of each of the plurality of openings, as the bus bar assembly is slidely disposed.

The bus bar assemblies and the battery stack may be connected to each other, the connected bus bar assemblies and the battery stack may be placed on a cooling plate, and the bus bar assemblies and the cooling plate may be bound to each other by a first fastening member.

An upper cover may be disposed on an upper side of the battery stack parallel to a direction in which the battery cells are stacked, a front cover and a rear cover may be disposed on both sides of the battery stack in the direction in which the battery cells are stacked, and the front cover and the rear cover may be bound with the cooling plate by a second fastening member, and the front cover and the rear cover may be bound with the upper cover by a third fastening member.

According to embodiments of the present invention, each of the plurality of electrode tabs may be easily positioned in each of the plurality of openings formed in the bus bar assembly.

In addition, according to embodiments of the present invention, an assembly performance between the plurality of electrode tabs and the bus bar assembly may be improved.

Further, according to embodiments of the present invention, even in the case of electrode tabs not arranged at a uniform interval, the electrode tabs may be easily inserted into openings of the bus bar assembly.

Further, according to embodiments of the present invention, by including the insertion portion for inserting the electrode tabs formed on one longitudinal side of the opening, it is possible to maintain a structural rigidity of the bus bar.

Furthermore, according to embodiments of the present invention, it is possible to maintain a structural rigidity even when vibrations or shocks are applied from an outside.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
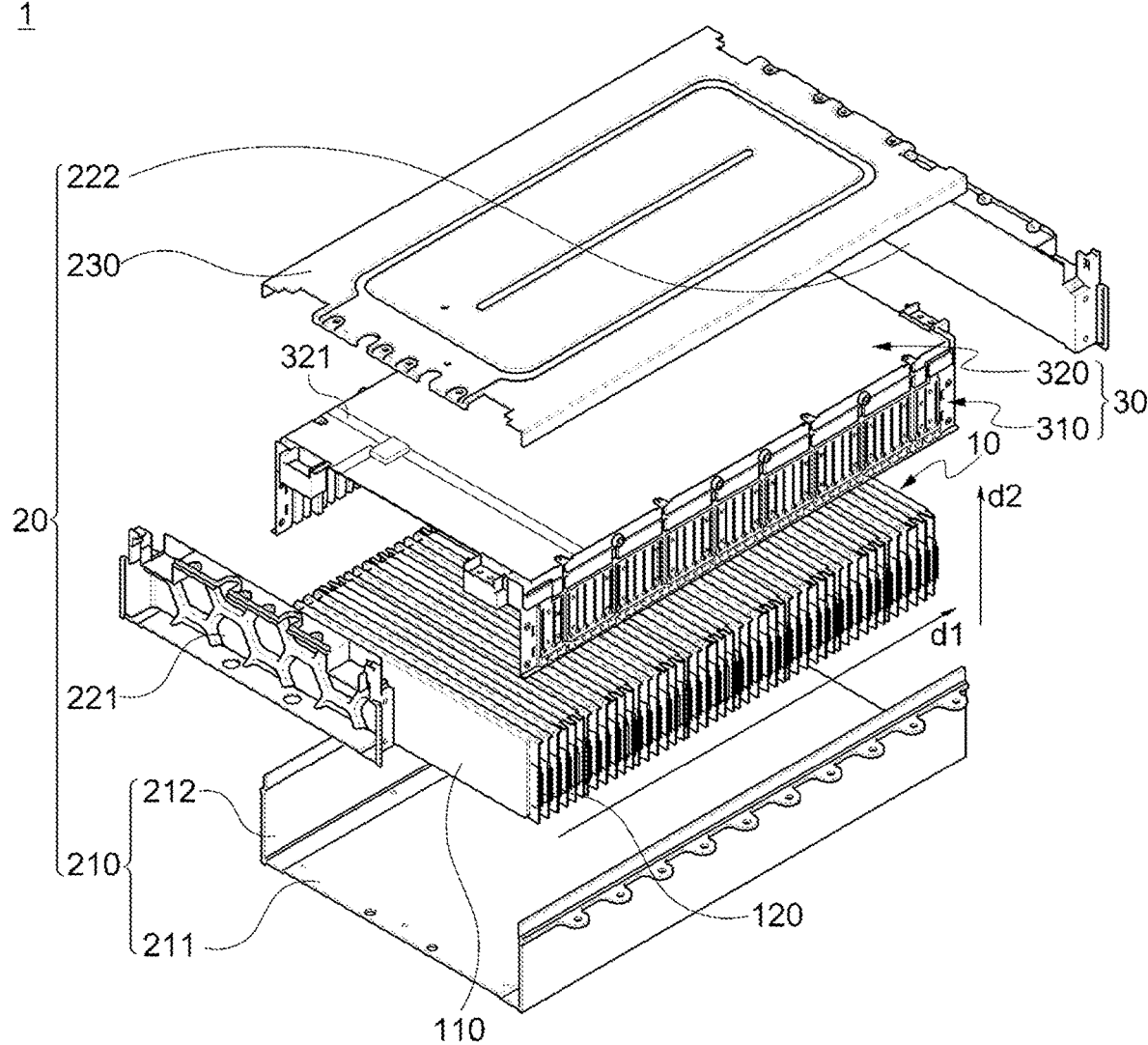
FIG. 1 is an exploded perspective view illustrating a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and may be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

FIG. 1 is an exploded perspective view illustrating a battery module 1 according to an embodiment of the present invention.

Referring to FIG. 1, the battery module 1 according to the embodiment of the present invention may include: a battery stack 10 formed by stacking a plurality of battery cells 110 respectively including electrode tabs 120 on each other; and bus bar assemblies 310 located on sides of the battery stack 10, from which the electrode tabs 120 are drawn out. The above-described battery stack 10 and the bus bar assemblies 310 may be housed in a case unit 20 with being fastened to each other. The above-described plurality of battery cells 110 of the battery stack 10 may be erected so that one side of all the plurality of battery cells 110 can be located on a lower side or an upper side with being stacked on each other.

Herein, the above-described case unit 20 may include: a cooling plate 211 disposed on the lower side of the battery cells 110 parallel to a direction d1 in which the battery cells 110 are stacked ('stacking direction of the battery cells 110'); a pair of side covers 212 formed perpendicularly to the cooling plate 211 on the sides of the battery stack 10, from which the electrode tabs 120 are drawn out, so as to surround the bus bar assembly 310; an upper cover 230 located so as to surround a side (a top side) of the battery stack 10 opposite to the cooling plate 211; and a front cover 221 and a rear cover 222 located so as to surround both sides of the battery stack 10 in the stacking direction d1 of the battery cells 110.

Meanwhile, the above-described cooling plate 211 and the side covers 212 may be integrally formed to form a cooling housing 210, and the pair of side covers 212 may vertically extend from both ends of the cooling plate 211 in the direction in which the electrode tabs 120 are drawn out. However, this is merely an example, and it is not limited thereto. For example, the cooling plate 211, the front cover 221, and the rear cover 222 may be integrally formed.

In addition, in the present disclosure, each of the plurality of battery cells 110 is a bidirectional cell in which the electrode tabs 120 protrude to both sides, and the present invention will be described on the basis of a case in which the bus bar assemblies 310 are disposed on both sides of the battery stack 10. However, this is merely an example, and it is not limited thereto. For example, each of the plurality of battery cells 110 may be a unidirectional cell in which the electrode tabs 120 protrude only on one side, and the bus bar assembly 310 may be located only on one side of the battery stack 10.

Furthermore, the battery module 1 according to the embodiment of the present invention may further include an upper assembly 320 disposed between the above-described battery stack 10 and the upper cover 230 on the upper side of the battery stack 10 parallel to the stacking direction d1 of the battery cells 110.

Details of the upper assembly 320 will be described below.

Figure 2:
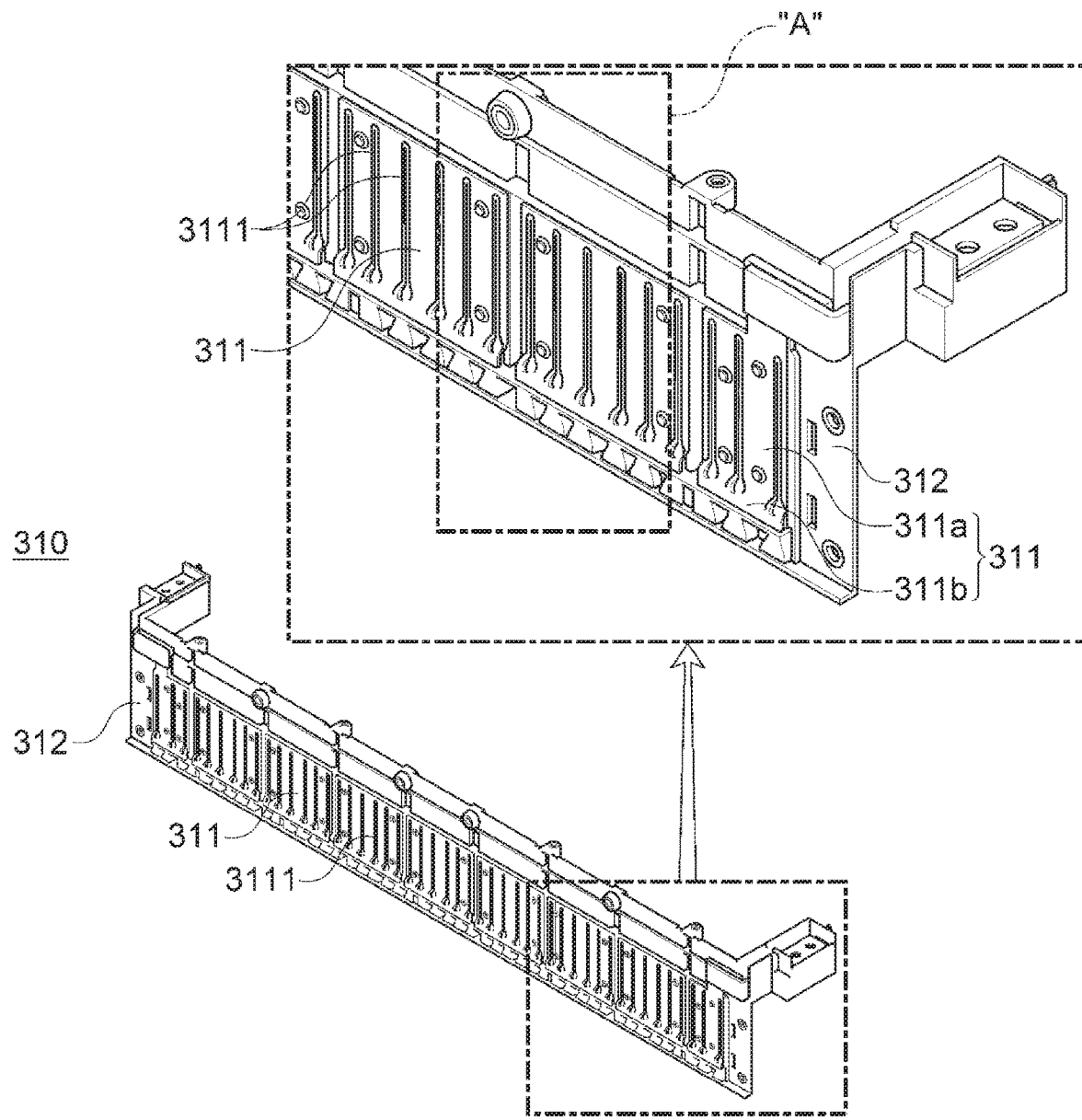
FIG. 2 is a perspective view illustrating a bus bar assembly of the battery module according to the embodiment of the present invention.
Figure 3A:
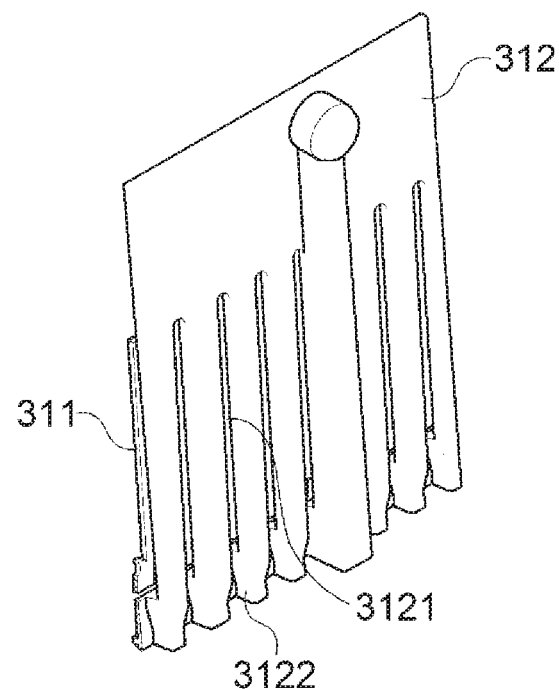
FIG. 3A is a rear perspective view of a portion A in FIG. 2.
Figure 3B:
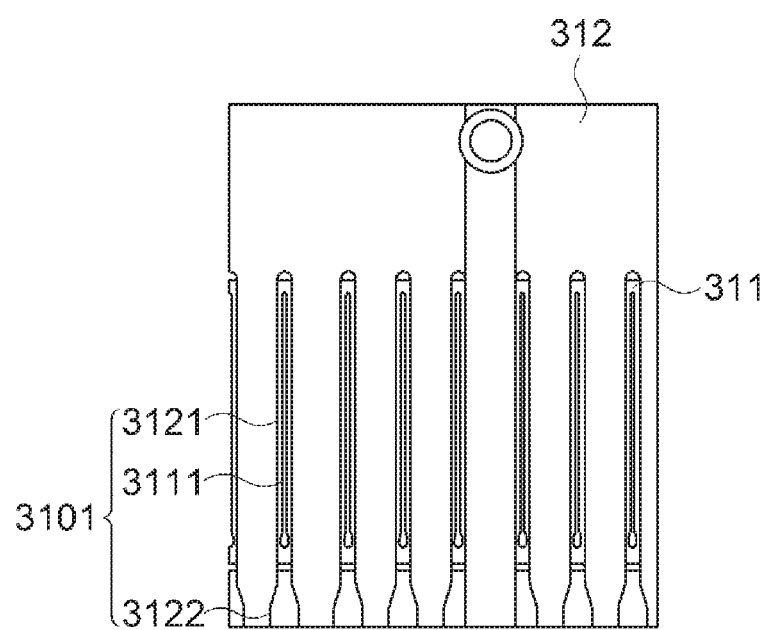
FIG. 3B is a rear view illustrating the portion A in FIG. 2.
Figure 3C:
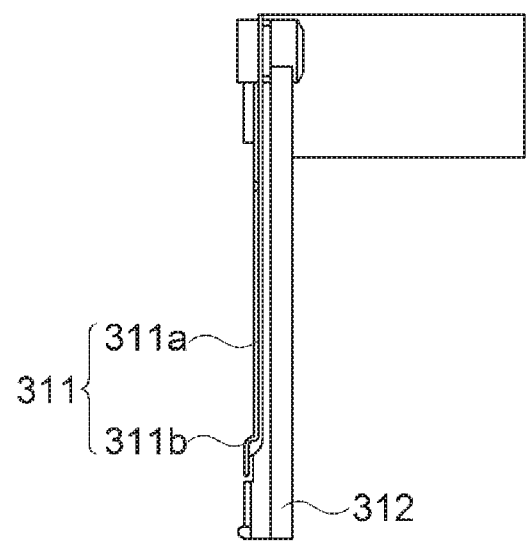
FIG. 3C is a side view illustrating the portion A in FIG. 2.

FIG. 2 is a perspective view illustrating the bus bar assembly 310 of the battery module 1 according to the embodiment of the present invention, FIG. 3A is a rear perspective view of a portion A in FIG. 2, FIG. 3B is a rear view illustrating the portion A in FIG. 2, and FIG. 3C is a side view illustrating the portion A in FIG. 2.

Referring to FIGS. 2 and 3, the above-described bus bar assembly 310 includes a plurality of openings 3101, each of which can hold each of a plurality of electrode tabs 120, and may electrically connect the plurality of battery cells 110 to each other by the plurality of electrode tabs 120 inserted and held in the plurality of openings 3101. In addition, each of the plurality of openings 3101 formed in the bus bar assembly 310 may include an insertion portion 3122 formed by opening one side thereof so that the electrode tab 120 can be slidely inserted in a direction (a direction d2 in which the electrode tab 120 is erected ('erecting direction d2 of the electrode tabs 120')) perpendicular to the direction, from which the electrode tabs 120 are drawn out, of the directions perpendicular to the stacking direction d1 of the battery cells 110.

Specifically, the bus bar assembly 310 may include one or more bus bars 311 disposed apart from each other, each of which includes one or more bus bar holes 3111, and a bus bar support 312 that supports the one or more bus bars 311 spaced apart from each other. At this time, the above-described bus bar support 312 is made of an insulating material such as plastic, such that electrical communication between one or more bus bars 311 may be blocked.

In this case, each of the above-described one or more bus bars 311 may be disposed on an outer surface of the bus bar support 312, and a portion of a contact surface may be thermally fused to be coupled thereto. However, this is merely an example, and it is not limited thereto, and any method may be used so long as the one or more bus bars 311 and the bus bar support 312 can be bound to each other by fitting or coupling to each other using fastening protrusions (not illustrated) and fastening holes (not illustrated), or by screwing with each other using screws and thread holes, for example.

Meanwhile, the bus bar holes 3111 formed in each of the above-described one or more bus bars 311 may be formed in a long hole shape having a predetermined length in the erecting direction d2 (top and bottom sides in the drawing) of the electrode tabs 120 which are erected by stacking the battery cells 110 so that the electrode tabs 120 can be inserted and held therein.

In addition, the above-described bus bar support 312 may include one or more support grooves 3121, and each of the one or more support grooves 3121 may be located parallel to each of the one or more bus bar holes 3111 in the direction in which the electrode tabs 120 are drawn out. In this case, the above-described one or more support grooves 3121 may be formed in a long hole shape having a predetermined length in the erecting direction d2 of the electrode tabs 120 so that the electrode tabs 120 can be inserted and held therein. In this case, the support groove 3121 and the bus bar hole 3111 may be arranged parallel to in the direction in which the electrode tabs 120 are drawn out, thereby forming the above-described opening 3101. As a result, the above-described opening 3101 may include the support groove 3121 and the bus bar hole 3111.

Meanwhile, the above-described insertion portion 3122 may be formed in one longitudinal end of the support groove 3121 in each of the one or more support grooves 3121, and the plurality of electrode tabs 120 may be slidely inserted into the support grooves 2121 from one side of the one or more support grooves 3121 through the insertion portion 3122 in the erecting direction d2 of the electrode tabs 120.

Meanwhile, each of the above-described one or more bus bars 311 may include a convex portion 311b formed by protruding one longitudinal side of the bus bar hole 3111 in the direction in which the electrode tabs 120 are drawn out. Specifically, the above-described convex portion 311b may be formed by bending one side (a lower side in the drawing) of each of the one or more bus bars 311, and the convex portion 311b may protrude to an outside of the battery stack 10 from a planar portion 311a of the bus bar 311 coupled to the bus bar support 312.

Furthermore, the above-described convex portion 311b may be located outside an end of the electrode tab 120 in the direction in which the electrode tabs 120 are drawn out.

Meanwhile, both longitudinal ends of each of the one or more bus bar holes 3111 in each of the one or more bus bars 311 may be formed to be blocked, and an end portion of at least one bus bar hole 3111 in each of the one or more bus bars 311 on a side in which the electrode tab 120 enters may be formed as the above-described convex portion 311b. That is, the bus bar hole 3111 may be formed over the convex portion 311b and the planar portion 311a on the bus bar 311.

As described above, the bus bar hole 3111 formed in the bus bar 311 is located in a state in which the both ends thereof are closed, such that the structural rigidity of each of the bus bars 311 may be maintained.

In addition, even during the electrode tab 120 is slidely inserted into the above-described opening 3101 in the erecting direction d2 of the electrode tabs 120, the bus bar hole 3111 whose one end (on the side into which the electrode tab 120 is inserted) is closed and the electrode tab 120 may be easily fastened without an interference therebetween.

More specifically, when slidely inserting the electrode tab 120 into the opening 3101 in the erecting direction d2, the electrode tab 120 may pass through the insertion groove formed at one end of the support groove 3121 of the bus bar support 312. At this time, the convex portion 311b of the bus bar 311 is located outside the end of the electrode tab 120 in the drawing out direction thereof, such that the electrode tab 120 may be guided to the bus bar hole 3111 through a portion extending to the planar portion 311a and the convex portion 311b of the bus bar hole 3111, and may be slidely inserted into the support groove 3121 and the bus bar hole 3111 (opening 3101) without an interference with the convex portion 311b.

Meanwhile, the above-described insertion portion 3122 may be formed with an entry width decreased toward inside the support groove 3121 from a lower end thereof on the side in which the electrode tab 120 enters so as to guide an entry of the electrode tab 120. That is, the insertion portion 3122 may be formed with a width in the stacking direction d1 of the battery cells 110, which is gradually decreased toward inside the support groove 3121 from the lower end thereof in which the electrode tab 120 first enters.

Thereby, even when the electrode tabs 120 are formed at somewhat non-uniform intervals, the electrode tabs 120 may be guided through the insertion portions 3122, thus to be easily inserted into the openings 3101 formed at a uniform interval.

In addition, as the above-described insertion portion 3122, an end of the above-described bus bar hole 3111 on the side in which the electrode tab 120 enters may be formed with a width in the stacking direction d1 of the battery cells 110, which is gradually decreased toward inside the bus bar hole 3111 so as to allow a position in which the electrode tab 120 first enters (a portion continued to the convex portion 311b from the planar portion 311a of the bus bar 311) to be moved therein.

Thereby, the electrode tab 120 entered into the support groove 3121 through the insertion portion 3122 may be easily guided and inserted into the bus bar hole 3111.

Figure 4:
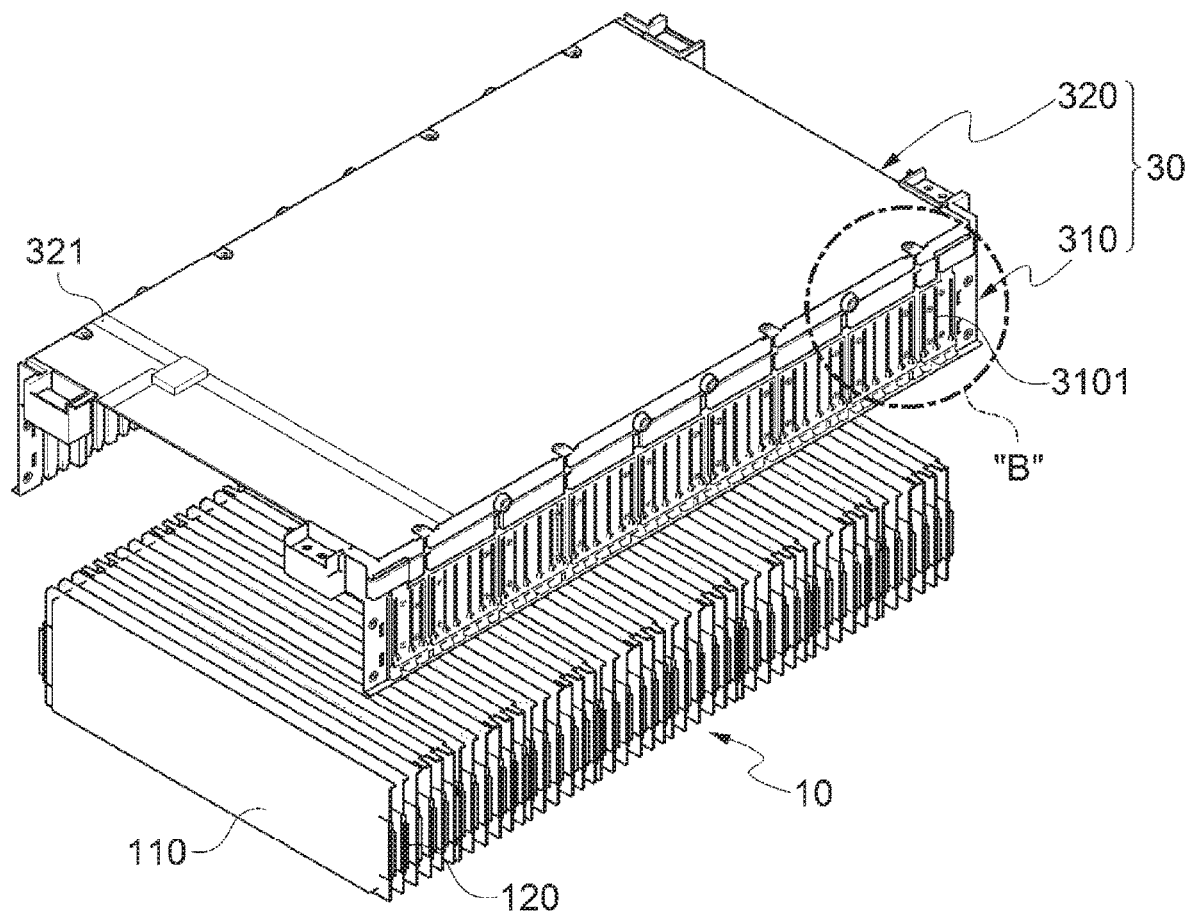
FIG. 4 is a perspective view illustrating a state in which an upper structure is placed on a battery stack of the battery module according to the embodiment of the present invention.
Figure 5A:
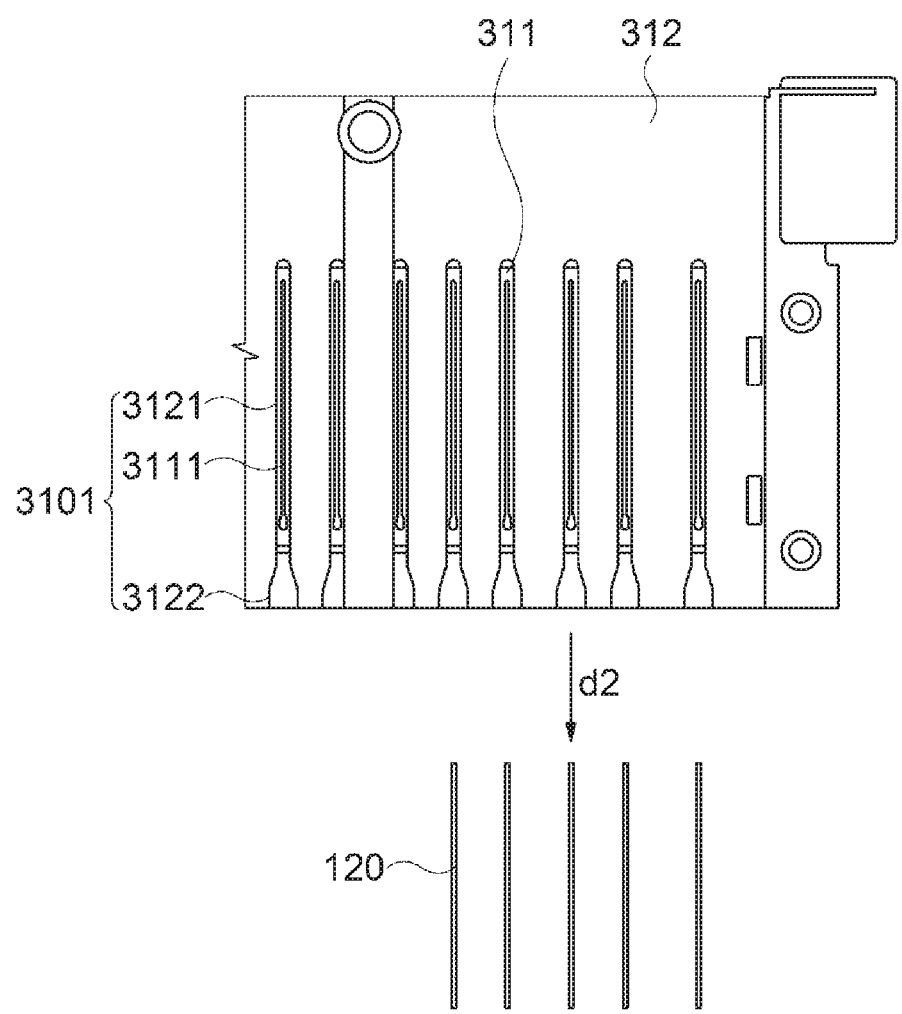
FIG. 5A is an enlarged view of a portion B in FIG. 4 for illustrating a state in which the bus bar assembly and electrode tabs are assembled.
Figure 5B:
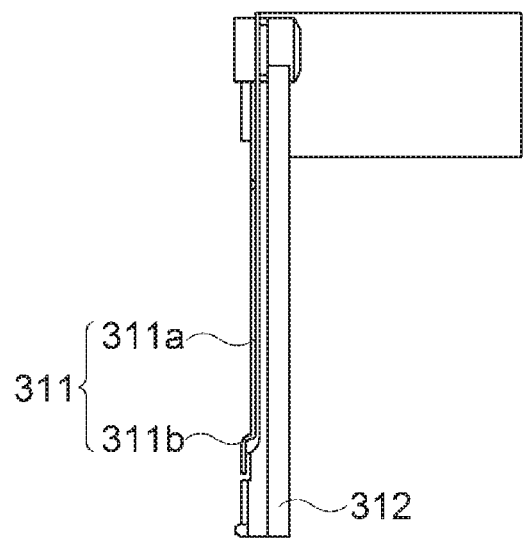
FIG. 5B is a side view illustrating the state in which the bus bar assembly and the electrode tabs are assembled.

FIG. 4 is a perspective view illustrating a state in which an upper structure 30 is placed on the battery stack 10 of the battery module 1 according to the embodiment of the present invention, FIG. 5A is an enlarged view of a portion B in FIG. 4 for illustrating a state in which the bus bar assembly 310 and electrode tabs 120 are assembled, and FIG. 5B is a side view illustrating the state in which the bus bar assembly 310 and the electrode tabs 120 are assembled.

Figure 5B:
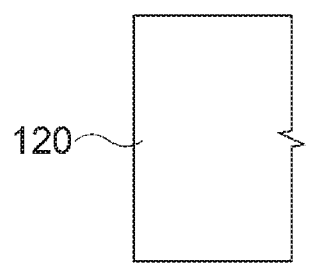

Referring to FIGS. 4 and 5, the bus bar assemblies 310 may be integrally formed with the above-described upper assembly 320 with being disposed perpendicular to each other. That is, the bus bar assemblies 310 may be integrally formed with the upper assembly 320 at both ends of the upper assembly 320 in direction in which the electrode tabs 120 are drawn out, and the integrated upper assembly 320 and the bus bar assembly 310 may form the upper structure 30.

As described above, in the battery module 1 according to the embodiment of the present invention, the bus bar assembly 310 may be moved in the erecting direction d2 of the electrode tabs 120, such that the plurality of electrode tabs 120 may be slidely inserted into the plurality of openings 3101. Since the electrode tabs 120 may be easily slidely inserted into the openings through the insertion portion 3122, an occurrence of an interference with the electrode tab 120 during sliding of the bus bar assembly 310 may be prevented.

In addition, since the bus bar assemblies 310 can slide in the erecting direction d2 of the electrode tabs 120, the upper assembly 320 and the bus bar assemblies 310 may be integrally formed. Thereby, the integrated bus bar assembly 310 and the upper assembly 320 may be moved from one side of the battery stack 10 to the other side (from a top side to a bottom side in the drawings) in the erecting direction d2 of the electrode tabs 120. In this case, each of the plurality of openings 3101 formed in the bus bar assembly 310 and the plurality of electrode tabs 120 may be disposed to slide with each other.

In addition, a connector 321 may be formed on the upper assembly 320 to mutually connect a pair of bus bar assemblies 310 located on both sides of the battery stack 10 in the direction in which the electrode tabs 120 are drawn out.

Specifically, the above-described connector 321 may be formed of a wire or flexible printed circuit board (FBCB) for transmitting and receiving electrical signals, and may transmit voltage or temperature information measured from the pair of bus bar assemblies 310 to a control circuit (not illustrated).

Meanwhile, according to another embodiment of the present invention, the above-described battery module 1 according to the embodiment of the present invention may be formed by stacking a plurality of battery cells 110 on each other to form the battery stack 10, and slidely disposing the bus bar assemblies 310 on the sides of the battery stack 10, from which the electrode tabs 120 are drawn out, in the erecting direction d2 of the electrode tabs 120.

In this case, as described above, the bus bar assemblies 310 may be integrally formed with the upper assembly 320 disposed on the upper side of the battery stack 10 at right angles to each other. Thereby, the above-described bus bar assemblies 310 may be moved in the erecting direction d2 of the electrode tabs 120 on one side (the upper side in the drawings) of the battery stack 10 together with the upper assembly 320 to be slidely disposed.

Specifically, during slidely disposing the bus bar assembly 310 on one side of the battery stack 10 in the erecting direction d2 of the electrode tabs 120, first, each of the plurality of electrode tabs 120 may be guided into each of the plurality of support grooves 3121 through the insertion groove formed in one end of the support groove 3121 of the bus bar support 312.

Then, the electrode tab 120 may slide in the support groove 3121 and guided into the bus bar hole 3111 through the portion extending to the planar portion 311a and the convex portion 311b of the bus bar hole 3111, may be inserted into the opening 3101 (the support groove 3121 and bus bar hole 3111) to be held without an interference with the convex portion 311b (particularly, a blocked portion of one end of the bus bar hole 3111) of the bus bar 311.

Figure 6:
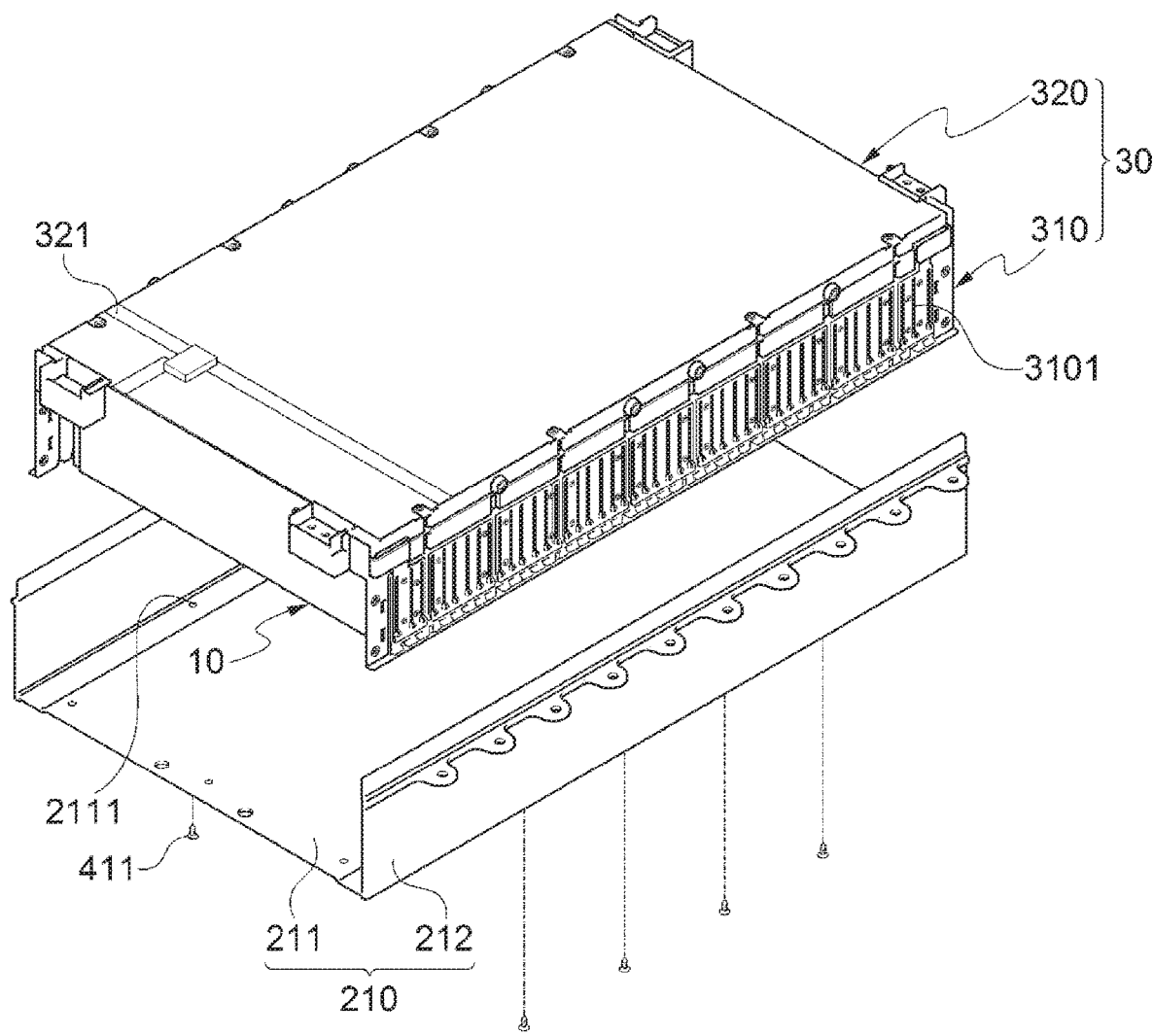
FIG. 6 is a perspective view illustrating a state in which the upper structure and the battery stack, which are fastened to each other, are fastened to a cooling housing according to another embodiment of the present invention.

FIG. 6 is a perspective view illustrating a state in which the upper structure 30 and the battery stack 10, which are fastened to each other, are fastened to the cooling housing 210 according to another embodiment of the present invention.

Referring to FIG. 6, when the slide placing of the bus bar assemblies 310 is completed, the electrode tabs 120 disposed in each of the plurality of openings 3101 formed in the bus bar assemblies 310 may be irradiated with a laser beam. Specifically, an end in the protruding direction of the electrode tab 120 may be irradiated with a laser beam in the erecting direction d2 of the electrode tabs 120, and may be electrically connected to a circumference of the bus bar hole 3111 by melting the electrode tab 120 by laser welding. Meanwhile, the circumference of the bus bar hole 3111 may be irradiated with the above-described laser beam, and a periphery of the bus bar hole 3111 may be melted, thus to be welded to the electrode tab 120.

Thereafter, the welded upper structure 30 and the battery stack 10 may be placed on the cooling housing 210 in which the cooling plate 211 and the pair of side covers 212 are integrally formed.

Meanwhile, a plurality of first fastening holes (not illustrated) may be formed in lower surfaces of the bus bar assemblies 310, and a plurality of second fastening holes 2111 may be formed at positions of the cooling plate 211, in which the bus bar assemblies 310 are placed.

In this case, the plurality of first fastening holes and the plurality of second fastening holes 2111 may be arranged coaxially with each other so that a plurality of fastening members can be inserted therein, and may be fastened to the cooling plate 211 by the first fastening members 411 vertically fastened to the cooling plate 211. The above-described fastening member may include rivets or bolts, etc., but this is merely an example, and it is not limited thereto.

As described above, the battery stack 10 is fastened to the cooling plate 211 through the bus bar assembly 310, such that the fixed state thereof on the cooling plate 211 may be maintained even when vibrations or shocks are applied from an outside, and the structural rigidity of the battery module 1 according to the embodiment of the present invention may be maintained.

Figure 7:
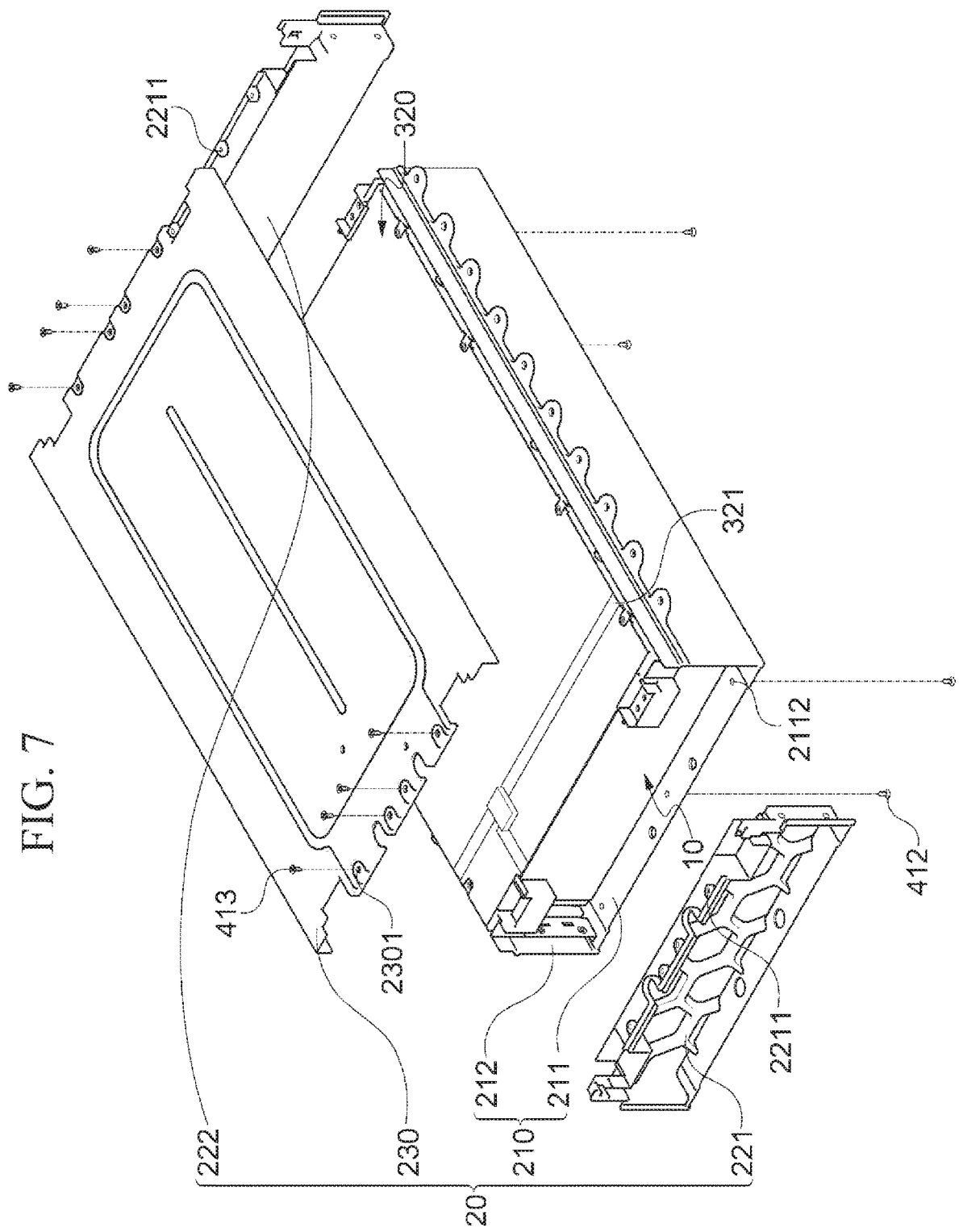
FIG. 7 is an exploded perspective view illustrating a state in which a front cover, a rear cover and an upper cover are fastened to the cooling housing according to another embodiment of the present invention.

FIG. 7 is a view illustrating a state in which the front cover 221, the rear cover 222 and the upper cover 230 are fastened to the cooling housing 210 according to another embodiment of the present invention.

Referring to FIG. 7, after the cooling housing 210 and the bus bar assembly 310 are fastened, the upper cover 230 may be disposed on the upper side of the battery stack 10, and the front cover 221 and the rear cover 222 may be disposed on both sides in the stacking direction d1 of the battery stack 10.

Meanwhile, a plurality of third fastening holes 2112 may be formed at positions in which the front cover 221 and the rear cover 222 of the cooling plate 211 are placed, and a plurality of fourth fastening holes (not illustrated) corresponding to the third fastening holes 2112 may be formed in the lower surfaces of the above-described front cover 221 and the rear cover 222.

At this time, the front cover 221 and the rear cover 222 are disposed on the cooling plate 211, then the front cover 221 and rear cover 222 and the cooling plate 211 may be bound to each other through the second fastening member 412 passing through the third fastening hole 2112 and the fourth fastening hole.

Furthermore, a plurality of fifth fastening holes 2211 may be formed on the upper surfaces of the front cover 221 and the rear cover 222. Herein, the above-described plurality of fifth fastening holes 2211 may be formed at positions in contact with the upper cover 230. In addition, a plurality of sixth fastening holes 2301 formed by penetrating toward the front cover 221 and the rear cover 222 may be formed at positions in contact with the front cover 221 and the rear cover 222 of the upper cover 230.

At this time, when the above-described upper cover 230 is disposed on the upper side of the battery stack 10, the front cover 221 and rear cover 222 and the upper cover 230 may be bound to each other through third fastening members 413 which are located above the front cover 221 and the rear cover 222, and then pass through the fifth fastening holes 2211 and the sixth fastening holes 2301.

That is, as described above, the second fastening member 412 and the third fastening member 413 are fastened in a direction perpendicular to the stacking direction d1 of the battery cells 110, such that an expansion of the plurality of stacked battery cells 110 may be further suppressed, and the structural rigidity of the case unit 20 may be improved.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the embodiments, but be defined by the appended claims as well as equivalents thereof.

DESCRIPTION OF REFERENCE NUMERALS

1: Battery module
10: Battery stack
110: Battery cell
120: Electrode tab
20: Case unit
210: Cooling housing
211: Cooling plate
2111: Second fastening hole
2112: Third fastening hole
212: Side cover
221: Front cover
222: Rear cover
2211: Fifth fastening hole
230: Upper cover
2301: Sixth fastening hole
30: Upper structure
310: Bus bar assembly 3101: Opening
311: Bus bar
3111: Bus bar hole
311a: Planar portion
311b: Convex portion
312: Bus bar support
3121: Support groove
3122: Insertion portion
320: Upper assembly
321: Connector
411: First fastening member
412: Second fastening member
413: Third fastening member
d1: Stacking direction of battery cells
d2: Erecting direction of electrode tabs

What is claimed is:

1. A battery module comprising:
a battery stack including a plurality of battery cells stacked, wherein each of the plurality of battery cells includes electrode tabs; and
bus bar assemblies located on sides of the battery stack, the bus bar assemblies electrically connecting the plurality of battery cells to each other through the electrode tabs, wherein the electrode tabs are drawn out from the sides of the battery stack,
wherein at least one of the bus bar assemblies comprises:
a bus bar support including an insertion portion; and
a bus bar disposed on an outer surface of the bus bar support, the bus bar including at least one bus bar hole;
wherein the bus bar support is extended downward and a lower side of the bus bar support is bent towards an outside of the bus bar support, and the lower side of the bus bar support is positioned below the bus bar,
wherein the bus bar comprises:
a first surface facing the outer surface of the bus bar support, and
a second surface disposed on opposite side of the first surface,
wherein the bus bar comprises a convex portion being concave on the first surface and convex on the second surface protruding away from the battery stack,
wherein the bus bar hole forms a closed curve on the first and second surfaces,
wherein the convex portion is formed in a lower side of the bus bar,
wherein a lower side of the bus bar hole is formed in the convex portion,
wherein the insertion portion is opened downward so that the electrode tab is inserted into the insertion portion and the bus bar hole sequentially,
wherein the electrode tab is electrically connected to a circumference of the bus bar hole by welding.

2. The battery module according to claim 1, wherein, when the bus bar assembly slides down to the electrode tabs, each of the electrode tabs is inserted and held in each of the insertion portions.

3. The battery module according to claim 1, further comprising an upper assembly disposed on an upper side of the battery stack, and
the bus bar assembly is integrally formed with the upper assembly.

4. The battery module according to claim 1, wherein the bus bar assembly is bound with a cooling plate.

5. The battery module according to claim 1,
wherein an upper cover is disposed on an upper side of the battery stack,
wherein a front cover and a rear cover are disposed on sides of the battery stack in the direction in which the battery cells are stacked.

6. The battery module according to claim 1,
wherein the bus bar support comprises a support groove connected with the bus bar hole, and
the bus bar hole and the support groove are elongated in an up-down direction.

7. The battery module according to claim 6, wherein the insertion portion is formed with a width decreased toward inside the support groove from a lower end thereof on a side in which the electrode tab enters so as to guide an entry of the electrode tab.

8. A method of manufacturing a battery module comprising:
stacking a plurality of battery cells to form a battery stack, each of the plurality of battery cells including electrode tabs; and
disposing bus bar assemblies on sides of the battery stack, wherein the electrode tabs are drawn out from the sides of the battery stack,
wherein the bus bar assemblies slide down to the electrode tabs,
wherein at least one of the bus bar assemblies comprises:
a bus bar support including an insertion portion; and
a bus bar disposed on an outer surface of the bus bar support, the bus bar including at least one bus bar hole;
wherein the bus bar support is extended downward and a lower side of the bus bar support is bent towards an outside of the bus bar support, and the lower side of the bus bar support is positioned below the bus bar,
wherein the bus bar comprises:
a first surface facing the outer surface of the bus bar support, and
a second surface disposed on opposite side of the first surface,
wherein the bus bar comprises a convex portion being concave on the first surface and convex on the second surface protruding away from the battery stack,
wherein the bus bar hole forms a closed curve on the first and second surfaces,
wherein the convex portion is formed in a lower side of the bus bar,
wherein a lower side of the bus bar hole is formed in the convex portion,
wherein the insertion portion is opened downward so that the electrode tab is inserted into the insertion portion and the bus bar hole sequentially,
wherein the electrode tab is electrically connected to a circumference of the bus bar hole by welding after disposing the bus bar assemblies on the sides of the battery stack.

9. The method of manufacturing a battery module according to claim 8,
wherein the battery module comprises an upper assembly configured to be disposed on an upper side of the battery stack,
wherein the bus bar assembly is extended downward from the upper assembly and integrally formed with the upper assembly,
wherein the bus bar assembly is disposed on the sides of the battery stack.

10. The method of manufacturing a battery module according to claim 8, wherein when the bus bar assembly is disposed on the sides of the battery stack, each of the electrode tabs slides into the insertion portion and the bus bar hole sequentially.

11. The method of manufacturing a battery module according to claim 8,
wherein the electrode tab is electrically connected to the circumference of the bus bar hole by irradiating a laser beam after disposing the bus bar assemblies on the sides of the battery stack.

12. The method of manufacturing a battery module according to claim 8, wherein the bus bar assemblies and the battery stack are connected to each other,
the connected bus bar assemblies and the battery stack are placed on a cooling plate, and
the bus bar assemblies and the cooling plate are bound to each other by a first fastening member.

13. The method of manufacturing a battery module according to claim 12, wherein an upper cover is disposed on an upper side of the battery stack,
a front cover and a rear cover are disposed on both sides of the battery stack in the direction in which the battery cells are stacked, and
the front cover and the rear cover are bound with the cooling plate by a second fastening member, and the front cover and the rear cover are bound with the upper cover by a third fastening member.

\* \* \* \* \*